United States Patent Office 3,211,776
Patented Oct. 12, 1965

3,211,776
CATALYTIC PROCESS FOR PREPARING
AROMATIC CHLOROFORMATES
Curtis Wayne Stephens, Wilmington, Del., assignor to
E. I. du Pont de Nemours and Company, Wilmington,
Del., a corporation of Delaware
No Drawing. Filed Jan. 22, 1963, Ser. No. 253,047
9 Claims. (Cl. 260—463)

This invention relates to a novel process for preparing aromatic esters of chloroformic acid. More particularly, it relates to the preparation of such esters by the reaction of a phenolic compound with phosgene in the presence of a catalyst.

Esters of chloroformic acid, the so-called chloroformates, have been prepared for many years, and have been recognized as useful intermediates in the preparation of numerous types of organic compounds. Such chloroformates possess reactive acid chloride groupings which are capable of condensation with compositions of matter which contain active hydrogen atoms. Thus, they may be reacted with primary or secondary amines to form urethanes, with compounds which contain hydroxyl groups to form diesters of carbonic acid, and with other similar types of organic compositions which contain active hydrogen atoms.

Chloroformates are prepared by the reaction of hydroxyl-bearing organic compositions with phosgene under a variety of conditions; the aliphatic chloroformates may be formed by simply contacting the alcohol with phosgene. Aromatic chloroformates, however, have required appreciably different conditions of preparation, and the direct reaction between a phenolic compound and phosgene has not been possible. Thus, the preparation of aromatic chloroformates has been effected generally by the reaction of phosgene with the appropriate sodium phenolate, either in aqueous solution or slurried in an organic solvent. Alternatively, the preparation has been carried out by the reaction of the phenol with a solution of phosgene in the presence of a molar equivalent quantity of a tertiary amine which serves as an acceptor for the hydrogen chloride generated by the reaction. In either case, however, it is necessary to separate the desired chloroformate from its preparative medium by a process which is time-consuming and costly.

It is an object of this invention to provide a novel preparative process for aromatic chloroformates.

It is a further object of this invention to provide a novel process for the direct reaction between a phenolic compound and phosgene.

It is a still further object of this invention to provide a novel process for the preparation of aromatic chloroformates by which they are produced in the absence of acid acceptors from the reaction of a phenolic compound with phosgene in the presence of a catalyst.

In accordance with these objects a phenolic compound, containing a single phenolic hydroxyl function, or a plurality of such groups, is converted to its chloroformate ester by reaction with phosgene in admixture with a minor quantity of a catalytic agent having the following formula:

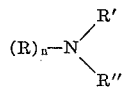

or a salt thereof, wherein $n$ is a cardinal number no greater than 1, R' and R'', which may be the same, represent hydrocarbon radicals containing from one to eight carbon atoms, preferably alkyl radicals containing from one to four carbon atoms each, which may be joined together to form and be part of a heterocyclic ring containing up to eight nuclear atoms, and R represents a member of the group consisting of hydrogen, diloweralkylamino, diloweralkylaminolower alkyl, and hydrocarbon of from one to eight carbon atoms, preferably alkyl of from one to four carbon atoms and when hydrocarbon, R may be joined with R' to form and be part of a heterocyclic ring of up to eight nuclear atoms with the proviso than when $n$ in zero, R' and R'' are joined to form and be part of an unsaturated heterocyclic ring containing up to eight nuclear atoms. If the catalytic compound employed is a salt, it should be the hydrohalide, preferably the hydrochloride, or other salt convertible thereto under the reaction conditions. The reaction is effected at a temperature within the range of from about 80° to about 200° C. in a sealed reaction vessel at super atmospheric pressure, i.e., autogenous or higher pressure in the absence of substantial quantities of an added acid-acceptor, and preferably in the absence of an added solvent.

Among suitable phenolic compounds which may be utilized in the preparation of the aromatic chloroformates of this invention may be named any mono-functional or polyfunctional phenols; these may, additionally, bear other nuclear substituents which are not reactive under the conditions of condensation employed. Among suitable monofunctional compositions are included phenol itself and β-naphthol; the halophenols, as o-chlorophenol, p-bromophenol, 2,5-dichlorophenol, 2,4,6-tribromophenol, and other similarly halogenated phenols; the cresols and other phenolic compounds which bear nuclear substituents of the aliphatic, cycloaliphatic, or aromatic hydrocarbon types, as, e.g., 2-ethylphenol, p-cyclohexylphenol, o-hydroxydiphenyl; and other similarly substituted compositions. Among mononuclear polyfunctional phenols, hydroquinone, 2,7-dihydroxynaphthalene, or their nuclearly-substituted analogs may be employed. Additionally, those dihydric or polyhydric phenols which have two or more aromatic nuclei joined by a carbon-to-carbon bond, an alkylidene group, sulfone linkage, or other small linking groups may be employed. Included in this latter category are biphenol, 4,4'-methylene disphenol, 4,4'-isopropylidene bisphenol, 4,4'-dihydroxydiphenyl sulfone and other similar bisphenols, including their nuclearly-substituted derivatives as, e.g., 4,4'-isopropylidene-bis(2, 6-dichlorophenol). Among the polyfunctional phenolic compounds, it is preferred that the difunctional substances be employed whose nuclei are stable under the reaction conditions. Where two phenolic hydroxyl groups are present on the same aromatic nucleus, it is preferred that they be attached to non-adjacent carbon atoms.

By the process of this invention the appropriate phenolic compound reacts with phosgene to produce the corresponding chloroformate ester of the phenol, in accordance with the following equation:

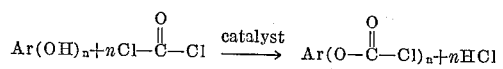

wherein $n$ is an integer, preferably 1 or 2, and $Ar(OH)_n$ represents the phenolic compound. As is noted from the equation, the process proceeds by a direct reaction between the phenolic compound and phosgene. As distinct from previous preparation, it is not necessary that the phenolic compound be employed in the form of its alkali metal salt, nor is a solvent or added acid-acceptor required.

The catalytic agents suitable for the process of this invention comprise (a) dialkylamines having indentical or unlike alkyl groups, such as dimethylamine, diethylamine, di-n-propylamine, di-i-propylamine, di-n-butylamine, di-secbutylamine, di-i-butylamine, di-t-butylamine, and the di-amylamines, methyl ethyl amine, methyl n-propyl amine, the methyl butyl amines, the methyl amyl amines, ethyl i-propyl amine, the ethyl butyl amines, n-propyl i-propyl amine, the i-propyl butyl amines, the n- butyl amyl amines, the sec-butyl amyl amines, and the like; (b) trialkylamines such as triethylamine, tri-n-propylamine, dimethyl n-butyl amine, dimethyl i-amyl amine, methyl ethyl n-butyl amine, and the like; (c) cyclic secondary and tertiary amines wherein the nitrogen is a ring-member, as pyrrolidine, piperidine, and hexamethyleneimine, their C-alkyl homologues such as 3-methylpyrrolidine and the dimethylpiperidines, N-methylpyrrolidine, N-ethylpiperidine, pyridine, 3-methylpyridine, and heterocycles containing an oxygen or sulfur atom in addition to the nitrogen such as morpholine, oxazolidine, 2,4 - diethyloxazolidine, thiazolidine, isothiazolidine, N-ethylmorpholine, N-methylthiazolidine, oxazole, thiazole, isothiazole, 2,4-dimethyloxazole; (d) alkyl monoaryl secondary and tertiary amines, as N-ethyl aniline, N,N-dimethylaniline, 4-N-methylamino - 1,3 - dimethylbenzene, and N,N-dimethylbenzylamine; (e) secondary and tertiary diamine analogues of the compounds described in (a) to (d), such as N,N' - dimethylhexamethylenediamine, N,N,N',N' - tetraethylethylenediamine, piperazine, N-alkylated piperazines, N-(N',N' -dimethyl - β - aminoethyl)piperidine, triethylenediamine, pyrimidine, pyrazine, pyrazole, and imidazole; (f) salts formed by neutralization of these amines with acids having a lower ionization constant than hydrochloric acid. Typical of suitable amine salts are dimethylamine hydrochloride, diethylamine acetate, N-ethylaniline hydrochloride, and piperidine carbonate.

Preferred among these catalytic agents are the secondary amines and their hydrochlorides, in particular, the dialkyl amines, notably those wherein the alkyl groups contain 1–4 carbon atoms.

The above-described catalytic agents, when present in minor amounts in mixtures of phenolic compounds and phosgene under the stated reaction conditions, are effective in promoting the formation of the chloroformate derivatives of said phenolic compounds. The catalytic agents are normally present to the extent of from about 2% to about 8% by weight of the phenolic component, although quantities as low as 0.5% or as high as 20% or more may be used if desired. The proportion of catalytic agents selected will be governed by such factors as the relative reactivity of the phenolic compounds, the reaction temperature, and the duration of the desired reaction period. It is neither necessary nor desirable that the catalytic agent be present to the extent of 1 mol or more per mol of phenolic compound; the function of the agent is therefore not merely that of an acid-acceptor. On the other hand, the effectiveness of the agents named above as catalysts for the formation of aromatic chloroformates may be demonstrated by the fact that, in their absence, substantially none of the chloroformate is formed from the mixture of the phenolic compound and phosgene, and that their presence in the above-stated catalytic quantities makes possible the formation of the chloroformate in substantial amount, generally 60% or more of the phenolic compound being converted to the corresponding chloroformate, as will be further disclosed in the examples which follow.

By the process of this invention it has now become possible to readily prepare previously unknown aromatic chloroformates, particularly those derived from phenolic compounds wherein one or more phenolic hydroxyl groups has reduced reactivity because of the presence of one or more large non-reactive substituent groups in a position ortho to said hydroxyl groups. Included among such so-called hindered phenols is 2,5-di-t-butylhydroquinone.

The process by which the aromatic chloroformates are prepared in accordance with this invention involves the addition of the phenolic compound, the appropriate amount of the catalytic agent, and a slight molar excess of phosgene to a reaction vessel which may be sealed and heated during the course of the subsequent condensation reaction. Addition of the phosgene to the reaction vessel may be accomplished by condensing the reactant into the cooled vessel, inasmuch as the normally gaseous material is liquefied at temperatures below about 8° C. at atmospheric pressure. An excess of phosgene is normally employed to aid in obtaining a more complete conversion of the phenolic compound to the desired chloroformate and to minimize side reactions; the quantity of phosgene may be as much as 5 molecules or more for each hydroxyl group present in the phenolic compound, there being nothing critical in the upper limit, although the preferred ratio is 1–1.4. If desired, less than the theoretical quantity of phosgene may be used, for example, 0.7 molecule of phosgene per hydroxyl group, although this will, of course, reduce the proportion of phenolic compound converted to the chloroformate. When operated as a batch process, and following the addition of starting materials to the reaction vessel, the vessel is sealed to prevent loss of reactants and heated to bring the reaction mixture within the vessel to a temperature within the range of from about 80° to about 200° C., preferably below 170° C.; the mixture is maintained at that temperature for a period of from about 1 hour to about 10 hours. During the course of the reaction, the pressure in the vessel rises to an autogenous pressure in excess of normal atmospheric pressure. Upon completion of the reaction time, the vessel is permitted to cool, the gaseous components of the reaction mixture (notably excess phosgene and by-product hydrogen chloride) are permitted to escape, and the residual material is subjected to purification in any of several ways known to the art. The mixture may be treated with a selective solvent to separate the catalytic agent from the chloroformate. Alternatively, this separation may be accomplished by recrystallization concurrently with the separation of the desired chloroformate product from any unreacted phenolic starting material. If desired, the product may be isolated and purified by distillation.

The following examples illustrate the present invention, but are not intended to limit it in any way. These examples are suitably carried out in vessels made from commercial alloys that are highly resistant to attack by hydrogen chloride, as for example the high-nickel content "Hastelloy B" or "Hastelloy C."

*Example I*

To a Hastelloy pressure vessel with an internal capacity of 500 milliliters (ml.) are added 22.5 grams (g.) (0.204 mole) of hydroquinone and 3.8 g. (0.052 mole) diethylamine, a nitrogen atmosphere desirably being maintained in the vessel during the loading. The vessel is closed, cooled in a Dry Ice/acetone bath, and evacuated; 63 g. (0.64 mole) of phosgene is added. The sealed vessel is heated at a temperature of 110° C. for 8 hours while being oscillated in a rocker assembly. The vessel and contents are allowed to cool; the volatile contents, notably unreacted phosgene and byproduct hydrogen chloride are allowed to escape, and the residual material is extracted by triturating with three separate portions of boiling n-hexane, the extract being decanted each time. The combined extracts are evaporated to dryness to provide 47 g. (80% conversion) of crystalline p-phenylene bischloroformate, which is found to melt at about 98° C.

When the reaction is repeated as described above, utilizing 20 g. (0.182 mole) of hydroquinone and 100 g. (1.01 mole) phosgene, but without the diethylamine or other catalytic agent, the hydroquinone charged is recovered unchanged.

*Example II*

Using the procedure of Example I, a mixture of 22.5 g. (0.204 mole) hydroquinone, 3.8 g. (0.037 mole) of triethylamine, and 63 g. (0.64 mole) phosgene is heated at 110° C. for 8 hours. From the reaction product by evaporation of the hexane extracts to dryness, p-phenylene bischloroformate is obtained in 83% conversion.

In a repetition of this experiment with a full molar equivalent of triethylamine, a mixture of 22.02 g. (0.20 mole) hydroquinone, 55.5 ml. (0.40 mole) of triethylamine, and 100 g. (1.01 moles) phosgene gives p-phenylene bischloroformate in 80% conversion.

*Example III*

Utilizing the procedure of Example I, p-phenylene bischloroformate is obtained in substantial amounts from the reaction between 22.02 g. (0.20 mole) hydroquinone and 100 g. (1.01 moles) phosgene in 100 ml. methylene chloride as the reaction medium utilizing about 0.01 mole of triethylamine hydrochloride.

*Example IV*

A mixture of 110 g. (1.0 mole) hydroquinone, 5 g. (0.061 mole) dimethylamine hydrochloride, and 220 g. (2.22 moles) phosgene is heated at 110° C. for 8 hours, utilizing the procedure of Example I. p-Phenylene bischloroformate is isolated in 77% conversion.

*Example V*

When the Example I procedure is utilized in effecting a reaction between 40 g. (0.216 mole) p,p'-biphenol, 2 ml. (about 0.024 mole) pyrrolidine, and 100 g. (1.01 moles) phosgene by heating at elevated temperatures, there is obtained a solid residue comprising p,p'-biphenylene bischloroformate, which has a melting point of 127° C. upon evaporation of the hexane extracts to dryness.

*Example VI*

Phenyl chloroformate is obtained when the procedure of Example I is utilized in effecting a reaction between 50 g. (0.53 mole) phenol, 2 g. (0.012 mole) of the acetic acid salt of triethylamine, and 100 g. (1.01 moles) of phosgene at 140° C. for 8 hours. The reaction vessel is cooled in ice water and vented in order to remove catalyst and any unchanged phenol from the product mixture left in the vessel, the product is shaken with 200 ml. methylene chloride and 50 ml. water. After separation of the water layer, the methylene chloride solution is washed with a second 50 ml. portion of water, dried with anhydrous calcium chloride, and then subjected to distillation. Phenyl chloroformate is a colorless liquid, having a boiling point of 95° C. at 20 mm.

*Example VII*

A mixture of 30 g. (0.132 mole) 2,2-bis(4-hydroxyphenyl)propane, 2 g. (0.015 mole) diethylamine carbonate of the formula $(C_2H_5)_2NH-H_2CO_3$, and 100 g. (1.01 moles) phosgene when heated at 120° C. for 7 hours, utilizing the general procedure shown in Example I yields 2,2-bis(4-chloroformoxyphenyl)propane. Evaporation of the hexane extract of the material remaining in the vessel after venting of the gases provides 2,2-bis(4-chloroformoxyphenyl)propane which has a melting point of 93–95° C.

*Example VIII*

By the Example I procedure, a mixture of 40 g. (0.364 mole) hydroquinone, 2 ml. (about 0.025 mole) pyridine, and 100 g. (1.01 moles) phosgene may be heated at 125° C. for 8 hours, to form a non-volatile product from which p-phenylene bischloroformate can be isolated via hexane extraction.

*Example IX*

The procedure of Example VI is followed in effecting a reaction utilizing a mixture of 50 g. (0.53 mole) phenol; 3.44 g. (0.02 mole) of N,N,N',N'-tetramethylhexamethylenediamine, and 100 g. (1.01 moles) phosgene. After this mixture is heated at 120–130° C. for 8 hours, it is cooled and vented. The method described in Example VI is utilized in isolating phenyl chloroformate from the residual non-volatile material.

Although the process of this invention has been exemplified with batch-type procedures, continuous operation may also be utilized without departing from the inventive concept. Suitable means for operation as a continuous process will be apparent to those skilled in the art. For example, separate feeds of phosgene, a phenolic compound, and a catalytic agent may be introduced simultaneously and continuously into a reaction vessel that is closed to the atmosphere and provided with heat-exchange means for maintaining the reaction mixture at a desired temperature, product being simultaneously withdrawn from the vessel at a rate controlled so as to maintain a constant quantity of reactants in the vessel. The size of the vessel and the throughput rate are selected so as to give an average residence time of, for example, 2 hours. The vessel may be a single chamber, a plurality of interconnected chambers, or a long pipe. Means for providing intermixing of the reactants within the vessel may suitably be provided. The reaction product withdrawn from the vessel is rectified by distillation or other suitable means to remove by-product hydrogen chloride and to isolate the chloroformate product. Unchanged phenolic compound, phosgene, and catalyst are returned to the reaction vessel together with additional starting materials.

The formation of chloroformates by the process of this invention is facilitated when the phenolic compound is in a liquid state under the reaction conditions; many such compounds are liquid under these conditions. High-melting phenols may be converted to a liquid state by dissolution, either in excess phosgene serving as a solvent, or by utilizing a separate inert solvent such as methylene chloride, chloroform, or chlorobenzene.

The novel process of this invention makes possible the rapid conversion of phenolic compositions to the corresponding chloroformates in high yield by a simple technique. Isolation of the desired products is readily effected without the need for costly and time-consuming separation from by-products, and products of high purity are quickly obtained. A measure of the high order of purity may be illustrated by the fact that, where dihydric phenols are employed as starting materials, the resulting bischloroformates are, following a single recrystallization, satisfactory for use in the formation of high molecular weight polymers, if good quality starting materials are employed. Because of their broad areas of application as chemical intermediates, it is particularly of interest that the aromatic chloroformates can be prepared in high conversion and yield by a relatively simple technique.

The chloroformates obtained by the process of this invention may be utilized as chemical intermediates in many applications, particularly in reactions with active hydrogen compounds. Thermoplastic polycarbonates may be made by the reaction between equimolar quantities of a bischloroformate and a bisphenol, as disclosed in U.S. Patents 3,028,365 and 3,036,036. The polyurethane prepared from piperazine and the bischloroformate of 2,2-bis(4-hydroxyphenyl)propane is shown in U.S. Patent 2,731,445 to be useful in making a strong fiber.

What is claimed is:

1. A process for preparing an aromatic ester of chloroformic acid which consists essentially of reacting phosgene with a phenol that is free of other nuclear substituents that are reactive under the conditions of condensation employed, in the presence of from about 0.5% to about 8% by weight based on the phenolic component, of a compound having the following formula:

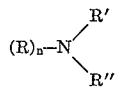

and salts thereof, wherein $n$ is a cardinal number no greater than 1, R' and R", which may be the same, represent saturated aliphatic hydrocarbon radicals of from one to eight carbon atoms, which when joined together form and are part of a heterocyclic ring of carbon and nitrogen and containing up to eight nuclear atoms and R represents a member of the group consisting of hydrogen, diloweralkylamino, diloweralkylaminolower alkyl, and saturated aliphatic hydrocarbon of from one to eight carbon atoms, which when joined with R' form and are part of a heterocyclic ring of carbon and nitrogen and containing up to eight nuclear atoms, with the proviso that when $n$ is zero, R' and R" are joined to form and be part of an unsaturated heterocyclic ring of carbon and nitrogen and containing up to eight nuclear atoms, at a temperature of between about 80° and 200° C.

2. The process of claim 1 wherein the catalytic compound is a hydrohalide salt under the reaction conditions.

3. The process of claim 1 wherein $n$ is 1, R' and R" are alkyl radicals of from one to four carbon atoms, and R is a member of the group consisting of hydrogen and alkyl of from one to four carbon atoms.

4. A process for preparing p-phenylene bischloroformate which consists essentially of reacting phosgene with hydroquinone in the presence of from about 0.5% to about 8% based on the weight of the phenolic component of diethylamine at a temperature of between about 80° and 200° C. and at superatmospheric pressure.

5. A process for preparing p-phenylene bischloroformate which consists essentially of reacting phosgene with hydroquinone in the presence of from about 0.5% to about 8% based on the weight of the phenolic component of triethylamine at a temperature of between about 80° and 200° C. and at superatmospheric pressure.

6. A process for preparing p-phenylene bischloroformate which consists essentially of reacting phosgene with hydroquinone in the presence of from about 0.5% to about 8% based on the weight of the phenolic component of dimethylamine hydrochloride at a temperature of between about 80° and 200° C. and at superatmospheric pressure.

7. A process for preparing phenyl chloroformate consisting essentially of reacting phosgene with phenol in the presence of from about 0.5% to about 8% by weight, based on the phenolic component of the acetic acid salt of triethylamine at a temperature of between about 80° and 200° C. and at superatmospheric pressure.

8. A process for preparing phenyl chloroformate consisting essentially of reacting phosgene with phenol in the presence of from about 0.5% to about 8% based on the weight of the phenolic component of N,N,N',N'-tetramethylhexamethylenediamine at a temperature of between about 80° and 200° C. and at superatmospheric pressure.

9. A process for preparing diphenylolpropane bischloroformate consisting essentially of reacting phosgene with 2,2-bis(4-hydroxyphenyl)propane in the presence of from about 0.5% to about 8% based on the weight of the phenolic component of diethylamine carbonate at a temperature of between 80° and 200° C. and at superatmospheric pressure.

References Cited by the Examiner

UNITED STATES PATENTS

| 2,370,571 | 2/45 | Muskat et al. | 260—463 |
| 2,648,697 | 8/53 | Heiberger | 260—463 |
| 2,873,291 | 2/59 | Spiegler | 260—463 |

FOREIGN PATENTS

| 808,490 | 2/59 | Great Britain. |

OTHER REFERENCES

Wagner and Zook, "Synthetic Organic Chemistry," pp. 483–4 (1953).

CHARLES B. PARKER, *Primary Examiner.*